(12) United States Patent
Shinoda et al.

(10) Patent No.: US 7,715,840 B2
(45) Date of Patent: May 11, 2010

(54) VEHICULAR WIRELESS APPARATUS

(75) Inventors: Koji Shinoda, Chiryu (JP); Kyoji Oda, Gamagori (JP)

(73) Assignee: Denso Corporation, Kariya (JP)

( * ) Notice: Subject to any disclaimer, the term of this patent is extended or adjusted under 35 U.S.C. 154(b) by 793 days.

(21) Appl. No.: 11/475,592

(22) Filed: Jun. 27, 2006

(65) Prior Publication Data

US 2007/0010294 A1     Jan. 11, 2007

(30) Foreign Application Priority Data

Jun. 30, 2005    (JP) .............................. 2005-192567

(51) Int. Cl.
*H04W 4/00*    (2009.01)
(52) U.S. Cl. ................. 455/435.1; 455/569.2; 455/574; 455/433
(58) Field of Classification Search ................. 455/572, 455/435.1, 418; 713/324
See application file for complete search history.

(56) References Cited

U.S. PATENT DOCUMENTS

| | | | | |
|---|---|---|---|---|
| 4,578,774 | A * | 3/1986 | Muller | 713/324 |
| 5,946,620 | A * | 8/1999 | Schultz et al. | 455/435.1 |
| 2002/0009978 | A1* | 1/2002 | Dukach et al. | 455/99 |
| 2003/0036415 | A1* | 2/2003 | Shimodaira et al. | 455/572 |
| 2004/0127206 | A1* | 7/2004 | Van Bosch et al. | 455/418 |

FOREIGN PATENT DOCUMENTS

| | | |
|---|---|---|
| JP | 02-109431 | 4/1990 |
| JP | 04-107016 | 4/1992 |
| JP | 04-310443 | 11/1992 |
| JP | 05-153044 | 6/1993 |
| JP | 08-051660 | 2/1996 |
| JP | 08-051661 | 2/1996 |
| JP | 09-294288 | 11/1997 |
| JP | 2003-032743 | 1/2003 |
| JP | 2004-007830 | 1/2004 |
| JP | 2004-260429 | 9/2004 |

OTHER PUBLICATIONS

Notice of Reason for Refusal mailed Dec. 22, 2009 in a corresponding Japanese application No. 2005-192567 with English translation.

* cited by examiner

*Primary Examiner*—Rafael Pérez-Gutiérrez
*Assistant Examiner*—German Viana Di Prisco
(74) *Attorney, Agent, or Firm*—Harness, Dickey & Pierce, PLC

(57) ABSTRACT

A vehicular wireless apparatus continues a standby state even after an ACC switch of the vehicle is turned off. In the vehicular wireless apparatus, when it is determined that the ACC switch is turned from on to off, paging area information stored in a RAM (volatile memory) is stored in an EEPROM (non-volatile memory). When the ACC switch is then turned from off to on, a power-on-reset is done for the whole of the vehicular wireless apparatus and paging area information stored in the RAM is reset. The paging area information stored in the EEPROM is then read. Whether a location registration should be newly done is determined based on the read paging area information.

3 Claims, 3 Drawing Sheets

VEHICULAR WIRELESS APPARATUS

CROSS REFERENCE TO RELATED APPLICATIONS

This application is based on and incorporates herein by reference Japanese Patent Application No. 2005-192567 filed on Jun. 30, 2005.

FIELD OF THE INVENTION

The present invention relates to a vehicular wireless apparatus including a wireless device for continuing a standby state even when an accessory (ACC) switch of the vehicle is off.

BACKGROUND OF THE INVENTION

For example, a mobile phone is in a standby state while it is supplied with power. The mobile phone can receive incoming calls from other phones. To receive incoming calls, the mobile phone needs to report a present paging area, where the mobile phone is present, via a base station to a location registration DB of a base station controlling station. The base station controlling station controls multiple base stations that form wireless areas as paging areas.

On receiving the report from the mobile phone, the base station controlling station stores and registers the mobile phone number in the location registration DB, in association with the paging area information. The base station controlling station notifies the mobile phone that its mobile phone number has been stored in the location registration DB in association with the paging area information, via the base station.

In particular, the mobile phone sends a location registration message to the DB via the base station. When the mobile phone receives a receipt acknowledgement (so-called ACK signal) of the message, the mobile phone determines that the location registration is complete. Then, the mobile phone stores information about the paging area, where the corresponding location registration is done, in its volatile memory device (hereinafter called a RAM).

Through these processes, the base station controlling station can specify which mobile phone is present in which paging area out of the multiple paging areas. The mobile phone can recognize the paging area from which the mobile phone receives incoming calls. These processes are generally called a location registration.

For example, a mobile phone makes a call, and there is an incoming request for a certain mobile phone which has registered its location in the base station controlling station. The base station controlling station notifies the paging area where the location of the certain mobile phone is registered, that there is an incoming request, by use of a paging channel. Accordingly, the certain mobile phone can receive the call and perform communications.

When entering a new communications area, the mobile phone receives information of a new paging area. The mobile phone determines whether the new paging area matches the paging area stored in the RAM. When the new paging area does not match, the mobile phone notifies the base station controlling station of a location registration message, which shows that the mobile phone is present in (moves to) the new communications area, via a base station. The mobile phone updates the information stored in its own RAM by using the new paging area where a new location registration is done. Accordingly, the mobile phone can perform communications anywhere in wireless areas.

The mobile phone has a power supply button (or switch) which can turn on or off the power supply, and for example, the power supply can be turned off on a train or in a hospital if necessary. When the user turns off the power supply of the mobile phone, a control device of the mobile phone writes information about the paging area stored in the RAM (hereinafter also called RAM-storing information), in a nonvolatile memory device (EEPROM) of the mobile phone. The control device then turns off the power supply for the mobile phone.

When the user presses the power supply button to turn on the power supply again, the control device receives new paging area information sent from the base station controlling station via a base station. The control device writes the information about the paging area which is stored in the EEPROM (hereinafter also called EEPROM-storing information), in the RAM. The RAM-storing information is thus returned to the state just before the power supply is tuned off.

The control device of the mobile phone compares the paging area information in the RAM with the paging area information received after the power supply is turned on. When the control device of the mobile phone determines that both do not match each other, the control device does a location registration with the base station controlling station via the base station. When the control device determines that both match each other, the mobile phone enters a state of waiting for incoming calls without doing the location registration. Accordingly, the redundant location registration can be avoided in the same paging area.

As a result, every time the power supply of the mobile phone is turned on and off, the redundant location registration can be avoided. This reduces loads in the communications with the base station controlling station via the base stations for the location registration. The writing in the EEPROM is executed only when the power supply is turned off. The number of the writings in the EEPROM can be small in comparison with the case where the writing is executed every time the paging area information in the RAM is updated. As a result, a longer time to reach the limit of the number of the writings in the EEPROM of the mobile phone leads to a longer life span of the mobile phone.

In recent years, vehicular wireless apparatuses have appeared. For example, use of a vehicular wireless apparatus provides the following: a remote car security function for reporting that a vehicle has been broken into even when the driver is away from the vehicle; an emergency report function for communicating with an outside in case of a contingency such as a traffic accident; and a guide function for obtaining congestion information or guide information about shops the driver wants to visit from an outside via communications.

For example, the car security function requires continuous communications even when the driver is away from the vehicle. Even when an ACC switch of the vehicle is off, the vehicular wireless apparatus needs to communicate with an outside of the vehicle.

As a result of the inventors' examination of this apparatus, the following operations are found. For example, regardless of whether the ACC switch of the vehicle is on or off, a control device of the vehicular wireless apparatus determines whether received new paging area information is different from RAM-storing information about the paging area (i.e., RAM-storing paging area information). When the new paging area information is different, the location registration is done as described above, and the paging area information in the RAM is updated to the new paging area information. The control device of the vehicular wireless apparatus does not update the paging area information in the EEPROM. These operations are the same as the above mobile phone.

The inventor has installed a power-on-rest in the whole of the vehicular wireless apparatus to stabilize; the power-on-reset runs when the user turns the ACC switch from off to on.

The RAM-storing paging area information of the vehicular wireless apparatus is reset by the power-on-reset and disappears. Accordingly, a location registration is newly done after the power-on-reset even though the paging area does not change actually.

Regarding the mobile phone, user's turning off the power supply button becomes a trigger of writing or duplicating the RAM-storing paging area information in the EEPROM. In contrast, the vehicular wireless apparatus does not have such a trigger.

Accordingly, with or without a change of the paging area information after the power-on-reset operated when the ACC switch is turned on, a location registration is newly done.

SUMMARY OF THE INVENTION

It is an object of the present invention to provide a vehicular wireless apparatus, in which wireless communications are possible even when an ACC switch is off and a load on a communications network is reduced by reducing unnecessary location registrations when the ACC switch is turned on.

According to an aspect of the present invention, a vehicular wireless apparatus is provided with the following. A wireless device is included for communicating with a base station that sends paging area information and for executing a location registration, which corresponds to the paging area information, to the base station. A volatile memory device is included for storing the paging area information to which the executed location registration corresponds. A nonvolatile memory device is included for storing the paging area information stored in the volatile memory. Memory control means is included for reading out the paging area information in the volatile memory device and for writing the read paging area information in the nonvolatile memory device. Vehicle operation determining means is included for determining whether a driving source of the vehicle stops or starts. Wireless activating means is included for activating the wireless device when the driving source is determined to start. Reset means is included for initializing the volatile memory device when the driving source is determined to start. Registration control means is included for (i) executing a determination whether paging area information, which is stored in the nonvolatile memory device before the driving source starts, matches paging area information, which is sent from the base station after the driving source starts, and (ii) causing the wireless device to execute location registration when the determination is negative while causing the wireless device to execute no location registration when the determination is affirmative. Wireless control means is included for running the wireless device for a predetermined time after the driving source is determined to stop. When the driving source is determined to stop, the memory control means writes the paging area information, which is stored in the volatile memory device, in the nonvolatile memory device.

Accordingly, a trigger of the writing in the nonvolatile memory device is generated when the driving source of the vehicle stops. The trigger causes the vehicular wireless apparatus to store the volatile-memory-storing information about the paging area, where the location registration is done just before the driving source stops, in the nonvolatile memory device for the next start. After the reset, the paging area information stored in the nonvolatile memory device is read and used for a determination of whether the paging area changes. This can decrease unnecessary location registrations, and loads on the communications network.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

A vehicular wireless apparatus 1 as an example embodiment according to the present invention will be explained below in reference to the drawings. A premise of the present invention is as follows: The vehicular wireless apparatus 1 is provided in a subject vehicle and supplied with an electrical power when a vehicle's accessory (ACC) switch is on for supplying power to in-vehicle devices; and the vehicular wireless apparatus 1 can operate by itself for providing services to a user even when the ACC switch is off.

The vehicular wireless apparatus 1 can continue communications even after the user turns off the ACC switch and gets off the vehicle. For instance, the vehicular wireless apparatus 1 is used to lock the vehicle from a place remote from the vehicle, or to report an abnormality to a previously registered contact of the user as soon as possible when an abnormality sensor mounted on the vehicle detects the abnormality in the vehicle such as when the vehicle is broken into.

The vehicular wireless apparatus 1 needs to keep operating to receive a remote control and report an abnormality of the vehicle even after the user leaves the vehicle. The vehicular wireless apparatus 1 to keep operating even while the ACC switch of the vehicle is off (or the ignition switch is off).

When the ACC switch is on, the vehicular wireless apparatus 1 operates as an automobile phone function for hands-free communications and as communications means for communicating with a server which provides information to a navigation device mounted in the vehicle.

Figure 1:
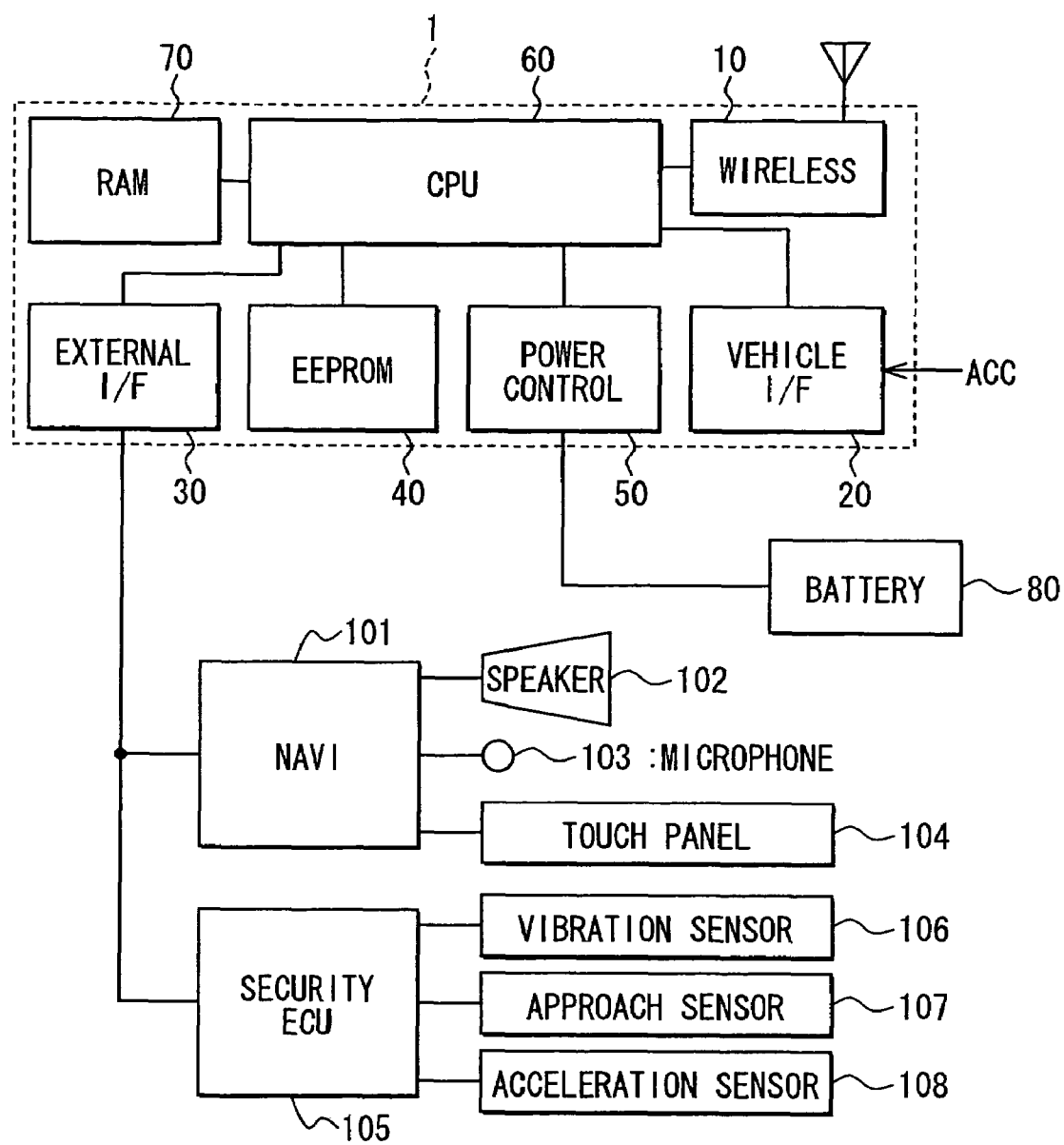
FIG. 1 is a diagram showing a structure of a vehicular wireless apparatus according to an example embodiment of the present invention.

Next, in reference to FIG. 1, a structure of the vehicular wireless apparatus 1 will be explained. FIG. 1 is a block diagram showing the structure of the vehicular wireless apparatus 1.

The vehicular wireless apparatus 1 includes: a wireless device 10 for wirelessly communicating with base stations of a mobile phone network; a vehicular control circuit interface 20 for detecting an ACC signal of the vehicle; an external device interface 30 which electrically connects with an external device such as a navigation device 101; a volatile memory device 70 (hereinafter, RAM 70) for storing paging area information corresponding to a paging area where a location registration is actually done to a base station; a nonvolatile memory device 40 (hereinafter, an EEPROM 40) for storing paging area information stored in the RAM 70; a power supply control device 50 for controlling power supply of the vehicular wireless apparatus 1; and a control device 60 (hereinafter, CPU 60) for controlling these components. Each base station notifies a wireless device in each wireless area of paging area information by use of a downstream wireless channel.

The wireless device 10 includes a GPS receiver (not shown), and can receive signals from a GPS satellite by itself. The vehicular wireless apparatus 1 sends a GPS signal received from the GPS satellite to a location server (not shown), where a location of the vehicular wireless apparatus 1 can be specified. Even when the ACC switch is off and the power supply of the navigation device 101 is off, the vehicular wireless apparatus 1 has a function for operating by itself to measure its own location.

The external device interface 30, such as a USB (Universal Serial Bus), connects between the navigation device 101 and vehicular wireless apparatus 1. By use of the external device interface 30, the navigation device 101 can control the vehicular wireless apparatus 1.

The navigation device 101 is known. The navigation device 101 is supplied with electrical power to operate when the ACC switch is turned on. When the ACC switch is turned off, the power supply is stopped.

A security ECU 105 having at least one of a vibration sensor 106, approach sensor 107, and acceleration sensor 108 connects with the external device interface 30. The vehicular wireless apparatus 1 sends a notification when the security ECU 105 notifies the vehicular wireless apparatus 1 of an abnormality of the vehicle.

The power supply control device 50 connects with a secondary battery 80 mounted to the vehicle to supply electrical power to the vehicular wireless apparatus 1 and to stop the power supply.

(Operations when the ACC switch is on)

The navigation device 101 calculates its own location by use of electric waves from the GPS satellites, displays the location on the map, and guides a travel to a destination. The navigation device 101 is connected to a microphone 103 and a speaker 102 (not shown: used for an audio device) of the vehicle. The so-called voice recognition is done for operating the navigation device 101 by use of voice inputted to the microphone 103. Guide sound is outputted from the speaker 102.

A display of the navigation device 101 has a touch panel 104, which functions as an operation device operated by a user. By touching this screen, the navigation device 101 can be operated.

In response to an instruction from the touch panel function operated by the user, the navigation device 101 can obtain outer information such as neighboring facilities information through the vehicular wireless apparatus 1. The navigation device 101 alone cannot obtain the outer information.

The touch panel 104 of the navigation device 101 forms a user interface of the automobile phone. For example, when the user inputs a phone number of a destination by use of the touch panel 104, and makes a call, the navigation device 101 sends the call to the CPU 60 via the external device interface 30. The CPU 60 makes the wireless device 10 make the call. After a line with a recipient is ensured, hands-free communications are executed. Voice of the recipient in the hands-free communications is outputted from the speaker 102 connected to the vehicular wireless apparatus 1. Voice of the source is sent to the recipient via the microphone 103.

(Operations when the ACC switch is off)

The power supply to the navigation device 101 is stopped. The power is supplied to only the vehicular wireless apparatus 1, which operates for a predetermined time (described later).

When an abnormality of the vehicle is detected in the security ECU 105, a notification about the abnormality is sent to the CPU 60 via the external device interface as an abnormality signal.

When the CPU 60 receives the abnormality signal, the CPU 60 reads a contact from the EEPROM 40, and makes a call to the specified contact automatically. The user may register and specify a phone number of the user and a phone number of an emergency contact in advance. A contact of a management company for emergency report services may be stored in advance.

Accordingly, because the specified contact is notified of an abnormality immediately when the abnormality is detected, the user can start returning to the vehicle immediately. This may limit damages to the vehicle.

When the vehicular wireless apparatus 1 receives a command sent from a center providing the abnormality report service, the vehicular wireless apparatus 1 starts the reception by the GPS receiver, and returns a result of the reception to the center. In the center, a location of the vehicle is specified from the received GPS data.

Figure 2:
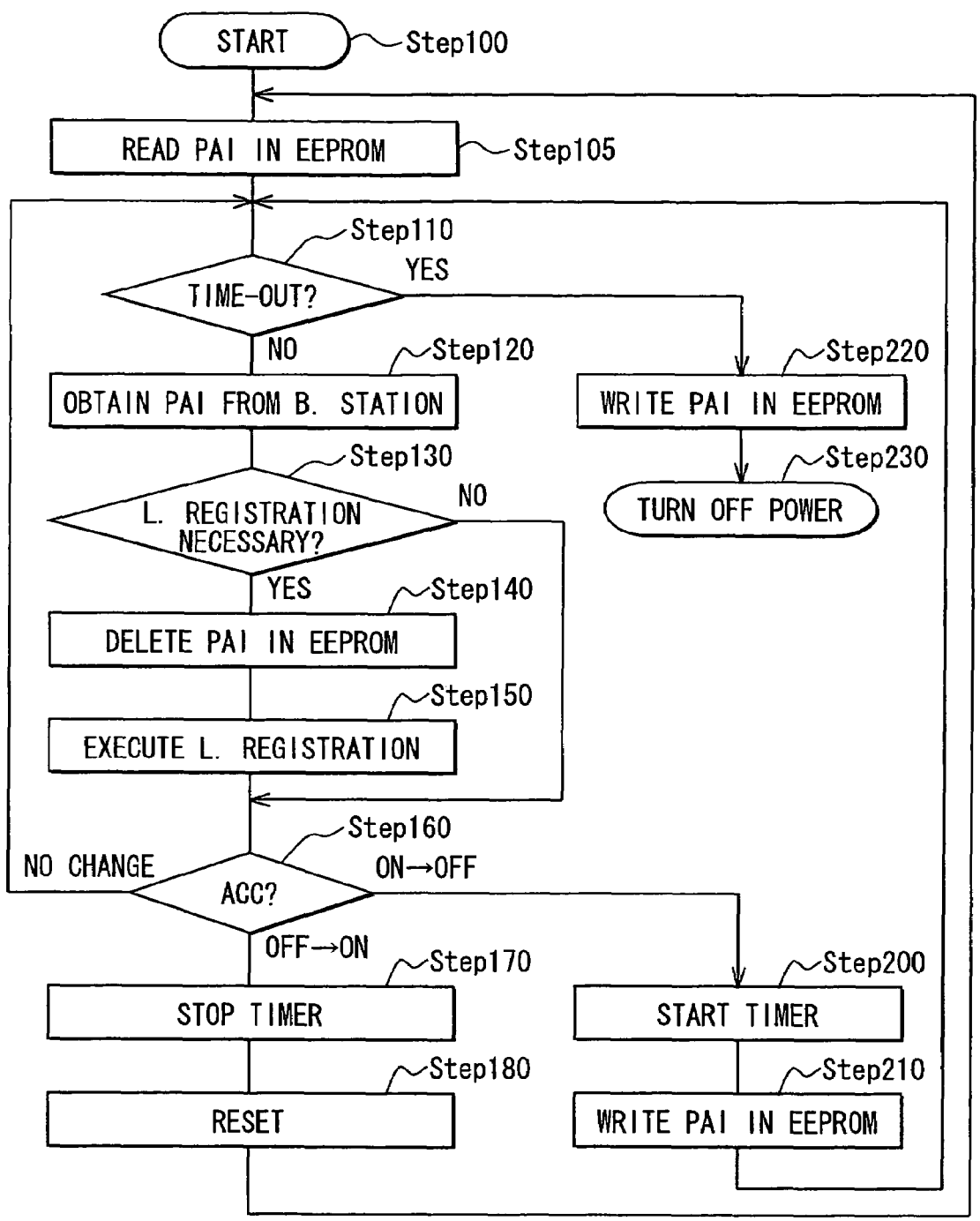
FIG. 2 is a flowchart of the vehicular wireless apparatus executed by a CPU.

Next, a memory control of the location registration of the vehicular wireless apparatus 1 will be explained in reference to FIG. 2. The memory control is a characteristic of the present invention. FIG. 2 is a flowchart showing a process of the CPU 60.

First, at Step 100, this flowchart starts when the vehicular wireless apparatus 1 is supplied with power from the battery 80. At Step 105, paging area information (PAI) stored in the EEPROM 40 is read, but at this time, no process is further executed. At Step 110, because a timer does not operate in this explanation, no process is executed at this time. The flowchart goes to Step 120 to obtain base station information.

To obtain the base station information, the wireless device 10 of the vehicular wireless apparatus 1 communicates with a base station when the wireless device 10 is in a standby state, and receives paging area information sent from the base station. In the standby state, the vehicular wireless apparatus 1 waits for incoming calls from other telephones.

Step 130 is a step for determining whether a location registration is necessary. At Step 130, different processes are executed in the following two cases, which are not described clearly in the drawing.

(1) The process just after the ACC switch is turned from off to on.

(2) The period while the ACC switch is on after the process in (1), and the period while the wireless device 10 operates for a predetermined time after the ACC switch is turned off.

In the case of (1), the CPU 60 compares the paging area information read from the EEPROM 40 at Step 105 with new paging area information received from the base station after the ACC switch is turned on. In accordance with the comparison, when it is determined that the two pieces of the information are different from each other, the location registration is determined to be necessary, and the flowchart goes to Step 140. When it is determined that the two pieces of the information are the same, the flowchart goes to Step 160.

When the vehicular wireless apparatus 1 is shipped from a factory, a value showing that the paging area information stored in the EEPROM 40 is invalid (zero or information about a nonexistent paging area) is stored in the vehicular wireless apparatus 1. In the case (1), when the vehicular wireless apparatus 1 is used for the first time, the location registration is determined to be necessary at Step 130. When the paging area information stored in the EEPROM 40 is the same as the paging area information stored in the RAM 70, communications for the location registration to the base station is unnecessary. Therefore, the load on the communications line can be decreased.

In the case of (2), the CPU 60 compares the paging area information stored in the RAM 70, the information corresponding to a paging area where the location registration is actually done, to new area information received from the base station. Then, it is determined whether to do the location registration.

The determination of whether the location registration is necessary, differs in the cases (1), (2).

Next, Step 140 is a memory control when the location registration is necessary (cases (1), (2)). The CPU 60 executes the memory control so that the paging area information stored in the EEPROM 40 is made invalid (zero or information about a nonexistent paging area is stored in the EEPROM 40), or so that the paging area information is deleted.

After that, the location registration of Step 150 is executed. The location registration is such that the base station is notified of where the vehicular wireless apparatus 1 is present in the database of the network, and a location of the vehicular wireless apparatus 1 is registered in the database DB (not shown) of the network. When the location registration is done, the vehicular wireless apparatus 1 stores the latest paging area information in the RAM 70. The paging area information shows that the vehicular wireless apparatus 1 is registered in the paging area where the location registration is done. At Step 130 in the case (2), the paging area information stored in the RAM 70 is used as a target of the comparison. Steps 130, 150 form location registration means.

After Step 160, the memory control is changed in accordance with a state of the ACC switch of the vehicle. At Step 160, the vehicular control circuit interface 20 detects a state change of the ACC switch. A result of the detection is sent to the CPU 60. The CPU 60 determines that there is no state change when the ACC switch remains off or on. Step 160 and the vehicular control circuit interface 20 form vehicle operation determining means. In other word, at Step 160, it is determined whether an engine (driving source) of the vehicle is in a stop state or active state.

For example, while the ACC switch remains off or on (the case (2)), the process of the location registration at Steps 110 to 160 is repeated. The control of this repetition is a known process, which is the same as a standby or communicating state of a mobile phone supplied with power.

For example, during this repetition, it is determined that the location registration is necessary at Step 130, when the ACC switch remains on (the ignition switch is on). In this case, as the vehicle moves, the paging area changes. Accordingly, the CPU 60 does the location registration at Step 150 to update the paging area information in the RAM 70.

Even while the ACC switch is off and the vehicle is parked, the vehicular wireless apparatus 1 can receive electric waves strongly from another paging area as a wireless environment where the vehicular wireless apparatus 1 is present changes. Then, the paging area information in the RAM 70 is updated (the zone change while the vehicle is parked).

Next, for example, the case when the ACC switch is turned from off to on (the ignition switch is turned on) in the determination at Step 160, such as when the user gets in the vehicle, will be explained. As a premise of the explanation, the ACC switch is off until the determination at Step 160. This corresponds to the case (1).

Step 170 is a control for stopping a timer, but the timer is not started in the above processes. The control for stopping the timer is a process for stopping the timer which has been stopped originally. Therefore, in this step, there is no substantial change. Operation of the timer is described later.

Step 180 is a reset control and a control for starting the vehicular wireless apparatus 1. When the CPU 60 is notified that the ACC switch is turned from off to on by use of the vehicular control interface 20, the CPU 60 resets the whole of the vehicular wireless apparatus 1. This reset process is the so-called power-on-reset, where the whole of the vehicular wireless apparatus 1 is reset for its stable operation, and the vehicular wireless apparatus 1 is started.

In this reset process, the CPU 60 executes the memory control so that the paging area information stored in the RAM 70 is reset (deleted). Naturally, the paging area information stored in the EEPROM 40 is not deleted, but remains stored. This Step 180 forms reset means and wireless starting means.

After that, at Step 105, the CPU 60 reads the paging area information stored in the EEPROM 40, namely, the paging area where the location registration is done before the ACC switch is turned off. At Step 130 after Step 105, the read paging area information is used for determining whether to done the location registration. After that, the CPU 60 repeats the process from Step 110 to Step 160 while the ACC switch remains on (the case (2)). In this case, because the ACC switch is on, the above service is provided to the user.

The process of the CPU 60 when the user turns the ACC switch from on to off (for example, when the user gets off the vehicle) will be explained. When the ACC switch is turned from on to off while the process from Step 110 to Step 160 is repeated, the CPU 60 is notified that the ACC switch is turned off by use of the vehicular control circuit interface 20. Then, the process goes from Step 160 to Step 200.

Step 200 is a timer control for counting a predetermined time after the ACC switch is turned off. The timer may use an oscillating device or oscillator (for example, a crystal-controlled oscillator) contained in the vehicular wireless apparatus 1 or may obtain a timing signal provided from the navigation device 101 via the external device interface 30. The timer may obtain the timing signal from a clock mounted on the vehicle via the external device interface 30.

After the timer is started, the process goes to Step 210. At Step 210, the CPU 60 stores (copies) the latest paging area information stored in the RAM 70 into the EEROM 40. This paging area information corresponds to the paging area where the location registration is done just before the ACC switch is turned off.

To store the paging area information, the CPU 60 stores the latest paging area information stored in the RAM 70 before the ACC switch is turned off, into the EEPROM 40 after the ACC switch is turned off, when the ACC switch is turned off. The process goes to Step 110. Timeout necessity determination at Step 110 is a step for determining whether the timer started at Step 200 times out. In the case where the timeout is set to, e.g., nine days, the CPU 60 determines NO before nine days elapse, and YES when nine days elapse.

First, the operation when the determination is NO (before nine days elapse) at Step 160 will be explained. In this case, the CPU 60 repeats the process from Step 110 to Step 160 when the ACC switch remains off, before nine days elapse (the case (2)).

At Step 120, as described above, the paging area information is received from the base station. At Step 130, the paging area information stored in the RAM 70 is compared to the new paging area information received at Step 120. Then, the CPU determines whether the location registration is necessary. The determination of the necessity of the location registration is described above.

When the location registration is determined to be necessary (YES) at Step 130 (the zone change when the vehicle is in a stop state), the CPU 60 makes the paging area information stored in the EEPROM 40 at Step 140 be invalid data (or be deleted). When the paging area information (which is the same as the paging area information written in the EEPROM 40 just after the ACC switch is turned off) stored in the RAM 70 after the ACC switch is turned off is different from new paging area information newly obtained at Step 120, the paging area information stored in the EEPROM 40 is made invalid. Then, the location registration at Step 150 is done.

Next, the control of the CPU 60 when this process is repeated, and nine days elapse after the ACC switch is turned off and the timeout occurs, will be explained.

At Step 110, when the timer started at Step 200 shows that a predetermined time (for example, nine days) elapses, the CPU 60 determines that the timer times out (YES).

Next, at Step 220, the CPU 60 executes the memory control so that the latest paging area information stored in the RAM 70 at Step 120 is stored in the EEPROM 40. After that, at Step 230, the power supply to the wireless device 10 is stopped.

Accordingly, because the power supply to the wireless device 10 is stopped when the predetermined time elapses, the current consumption of a battery of the vehicle can be reduced. The problem that the battery runs out can be decreased. Step 220 forms the power supply control means. Steps 110, 230 form the wireless control means.

After that, when the ACC switch is turned from off to on, the vehicular wireless apparatus 1 starts again. Then, the paging area information stored in the EEPROM 40 is used for determining whether to do the location registration. The load on the communications line used for the location registration is to be minimized. It is preferable that newest paging area information be stored in the EEPROM 40. (Because it is highly possible that a wireless environment changes over time, it is highly possible that the paging area information is changed. It is preferable that the elapsed time be minimized to reduce the location registrations). At Step 220, the latest paging area information received just before the power supply to the wireless device 10 is stopped is stored in the EEPROM 40. As a result, the location registration after the ACC switch is turned on in the next time can be suppressed.

Figure 3:
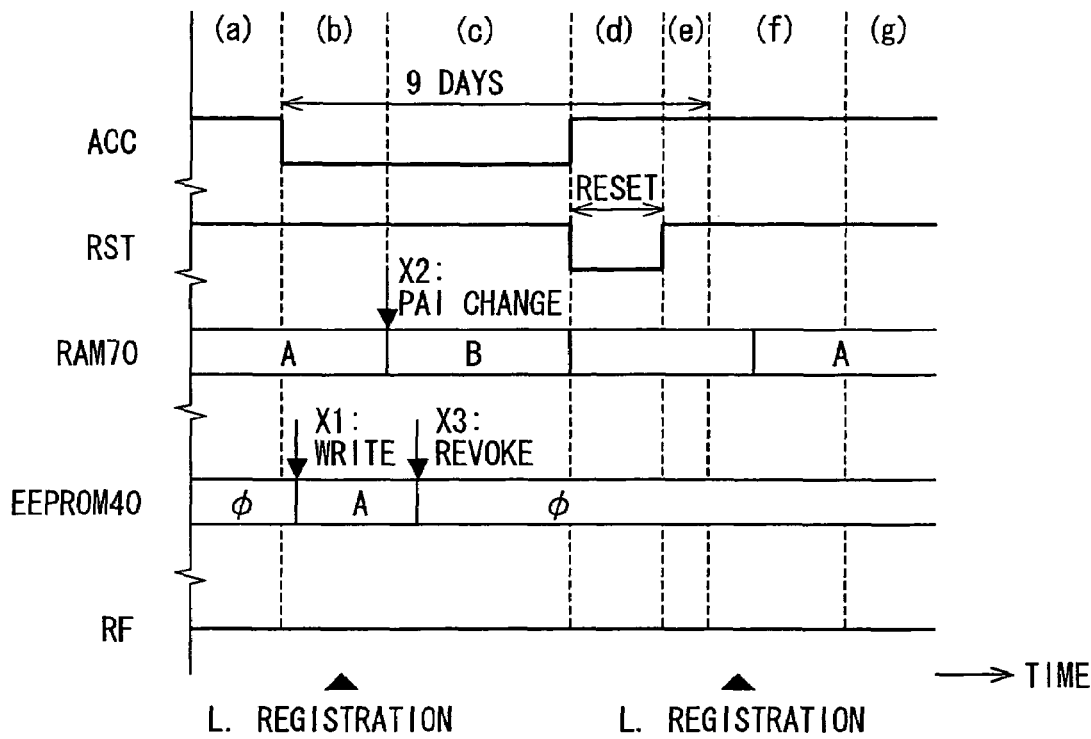
FIG. 3 is a time chart of the vehicular wireless apparatus before a timeout executed by the CPU.

Next, the memory control of the vehicular wireless apparatus 1 in case of the location registration will be explained in reference to FIG. 3. This memory control is a characteristic of the present invention. FIG. 3 is a time chart showing a process of the CPU 60. FIG. 3 shows the memory control in the case when the user turns the ACC switch from on to off such as when the user gets off the vehicle, and the user gets in the vehicle again before the timer counts nine days, and turns the ACC switch from off to on. In this case, the wireless device 10 is restarted during operation when the ACC switch is turned on.

The time axis goes from left to right. The state changes from (a) to (g). The "ACC" is a state of the ACC switch of the vehicle. In case of H (high), the ACC switch is on. In case of L (low), the ACC switch is off, i.e., the vehicle is stopping. The time chart shows that the ACC switch is turned from on to off once, and turned off to on again. The "RST" is inputted from the vehicle control circuit interface 20. The "RST" indicates a reset signal for resetting the whole of the vehicular wireless apparatus 1. In case of L (low), the reset signal is sent. In case of H (high), the reset signal is not sent, i.e., on a stop state.

The reset signal is sent during a given time after when the ACC switch is turned from off to on. After that, the reset signal is stopped when the given time elapses. The "RAM 70" shows a change of the paging area information stored in the RAM 70. The paging area information changes in the order from left: A, B, blank (memory initialization because of the reset), A. The "EEPROM 40" shows a change of the paging area information stored in the EEPROM 40. The paging area information changes in the order: $\phi$, A, $\phi$. The "RF" indicates a state of the wireless device 10. In case of H (high), the wireless device 10 is on an active state, i.e., during operation. In case of L (low), the wireless device 10 is in a stop state.

With reference to (a) in FIG. 3, when the ACC switch is on, the "ACC" is in an on state, the "RST" is in a stop state, paging area information A is stored in the RAM 70, and information $\phi$ (invalid) is stored in the EEPROM 40. The RF is in an active state.

When the ACC switch is turned from on to off, e.g., when the user gets off the vehicle, as shown in (a) to (b) of FIG. 3, the CPU 60 executes the memory control so that the paging area information A previously stored in the RAM 70 is stored (copied) in the EEPROM 40 at a time X1 in FIG. 3. Then, the wireless device 10 continues receiving the paging area information sent from the base station.

As shown in (b) to (c) of FIG. 3, when the paging area information received by the wireless device 10 changes from A to B, the CPU 60 compares the paging area information A stored in the RAM 70 with the new received paging area information B. The CPU 60 determines that A≠B, namely, the two pieces of the paging area information are different from each other. Then, the CPU 60 does the location registration to the base station and notifies the base station that A is changed to B. The base station stores the fact that a location of the vehicular wireless apparatus 1 is registered in the paging area information B, in the DB of the network. After this notification, the CPU 60 updates the information about the paging area where the location registration is actually done, from A to B, and stores it in the RAM 70 at a time X2 in FIG. 3. The CPU 60 executes the memory control so that the paging area information stored in the EEPROM 40 is changed from A to $\phi$ (invalid) at a time X3.

Then, the user gets in the vehicle. As shown in (c) to (d) of FIG. 3, the CPU 60 sends the reset signal during the given time when the ACC switch is turned from off to on. The reset is being done in (d) of FIG. 3. The CPU 60 sends the reset signal and initializes (deletes) the paging area information B stored in the RAM 70. The EEPROM 40 is not influenced by the reset signal. The paging area information $\phi$ (invalid) is stored in the EEPROM 40.

As shown in (e) of FIG. 3, the reset ends, and the wireless device 10 is restarted, so that the wireless device 10 receives new paging area information. After that, in (f) of FIG. 3, the CPU 60 reads the paging area information stored in the EEPROM 40, and determines that the location registration is necessary because the read paging area information is $\phi$ (invalid). Then, the location registration is done. The location registration is done when the ACC switch is turned on, because the paging area information stored in the EEPROM 40 is $\phi$ (invalid).

Assume that the paging area information of the EEPROM 40 remains A instead of changing to $\phi$ (invalid) in (c) of FIG. 3, and new paging area information received after the reset is A. On this assumption, the vehicular wireless apparatus 1 recognizes its own paging area information as A and determines that its own paging area information is the same as the paging area information before the reset. Therefore, the location registration is not newly done. Actually, because a location of the vehicular wireless apparatus 1 is recognized as the paging area B on the network, the location registration information remains different between the vehicular wireless apparatus 1 and the base station.

Therefore, when there is an incoming call for the vehicular wireless apparatus 1 in this situation, the base station notifies the paging area B of the incoming call; however, because the vehicular wireless apparatus is actually present in the paging area A, the vehicular wireless apparatus cannot receive the incoming call. To avoid such situation, when the paging area information stored in the RAM 70 is updated, the paging area information stored in the EEPROM 40 is made φ (invalid). Accordingly, the paging area recognized by the vehicular wireless apparatus 1 is prevented from differing from the paging area where location registration is done and which is actually stored in the network. As a result, the vehicular wireless apparatus 1 can receive incoming calls certainly.

Figure 4:
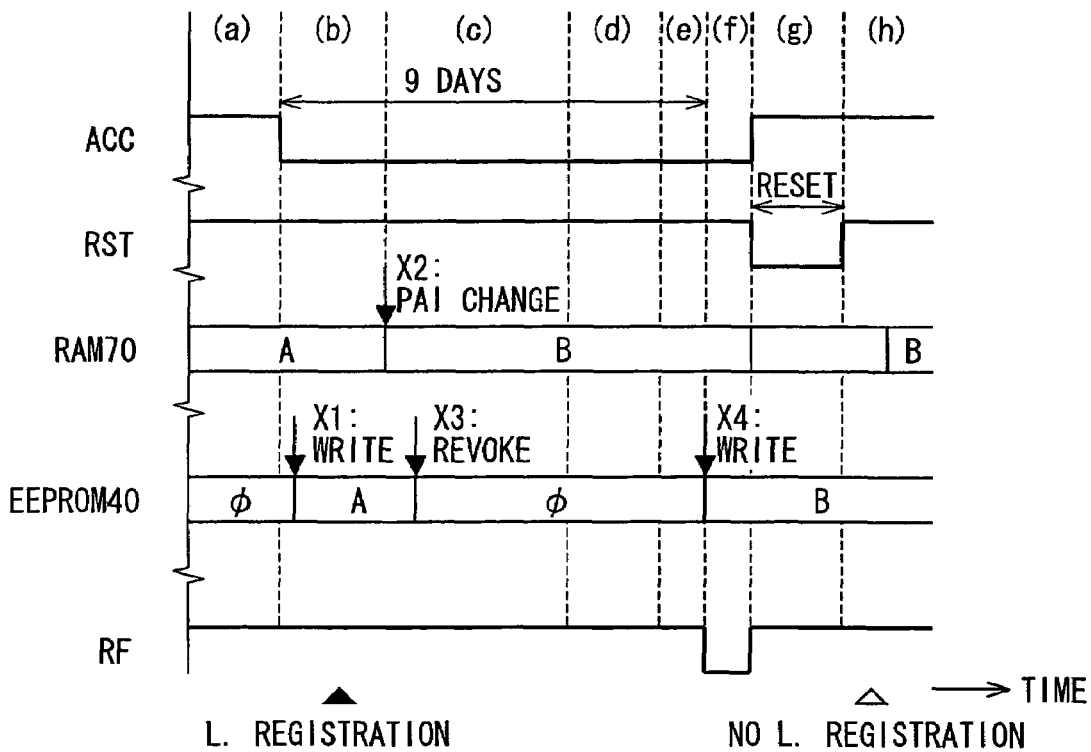
FIG. 4 is a time chart of the vehicular wireless apparatus after the timeout executed by the CPU.

Next, FIG. 4 will explains the memory control when the user gets in the vehicle again after the timer counts nine days, and turns the ACC switch from off to on. FIG. 4 is also a time chart showing a process of the CPU 60. FIG. 4 shows the memory control when the user turns the ACC switch from on to off, the ACC switch is not turned on, for example, for ten days larger than nine days that are counted by the timer. The power supply to the wireless device 10 is stopped once nine days after the ACC switch is turned off, and the ACC switch is then turned from off to on again ten days after the ACC switch is turned off. In this case, not like the example of FIG. 3, the wireless device 10 is started from the off state (where the power supply is stopped) when the ACC switch is turned from off to on.

The operation of (a) to (c) of FIG. 4 is the same as FIG. 3. In contrast, although the ACC switch is turned from off to on in (d) of FIG. 3, the ACC switch remains off in (d) of FIG. 4. Therefore, the memory control associated with a change of the state of the ACC switch in (d) of FIG. 3 is not executed. The timer times out when (e) of FIG. 4 ends to enter (f) of FIG. 4 at a time X4 in FIG. 4. Namely, FIG. 4 illustrates the memory control when nine days elapse after the user turns off the ACC switch when leaving the vehicle. At this time X4, the CPU 60 stops the power supply to the RF, and the CPU 60 executes the memory control so that the paging area information stored in the RAM 70 is written in the EEPROM 40. After that, the CPU 60 stops the power supply to the RF during (f) of FIG. 4.

After that, at a time period from (f) to (g) of FIG. 4, the user gets in the vehicle and turns the ACC switch from off to on. The ACC switch is turned from off to on. The CPU 60 starts the power supply to the wireless device 10 when the user turns the ACC switch from off to on. During (g) of FIG. 4, the reset signal is sent, and the reset is being executed. The CPU 60 initializes the paging area information B stored in the RAM 70 because of the reset.

After the reset ends as shown in (h) of FIG. 4 after the reset during (g) of FIG. 4, the vehicular wireless apparatus 1 is started and receives new paging area information B via the wireless device 10. The received paging area information B is compared with the paging area information B stored in the EEPROM 40. In this case, it is determined that the two pieces of the information are the same paging area information B. Accordingly, the location registration is not newly done.

In accordance with the present invention, when the ACC switch is turned off, the memory control is executed so that the paging area information of the RAM 70 is stored in the EEPROM 40. Accordingly, after the ACC switch is turned on, and the vehicular wireless apparatus 1 (including RAM 70) is reset, new paging area information received in the wireless device 10 can be compared to the paging area information stored in the EEPROM 40 before the new paging area information is received.

As a result, when the two pieces of the paging area information are the same, the location registration is controlled not to be done. The number of the location registrations can be reduced, and the loads on the communications line can be reduced. The number of the writings in the nonvolatile memory device can be reduced, and thus a lifespan of the nonvolatile memory device can be made longer.

In the present invention, the power supply to the wireless device 10 is stopped automatically when the predetermined time (nine days) elapses, so that the current consumption can be reduced. In this case, because the latest paging area information stored in the RAM 70 is stored in the EEPROM 40 when the power supply is stopped, the location registrations can be reduced when the ACC switch is turned on next and the vehicular wireless apparatus 1 is started.

In the present invention, when the ACC switch is turned off, and the paging area information stored in the RAM 70 is then updated (A to B), the paging area information stored in the EEPROM 40 is switched from A to invalid. Accordingly, this can prevent the situation that the vehicular wireless apparatus 1 cannot receive incoming calls due to discrepancy between (i) the paging area where the location registration is done and which is recognized actually on the network and (ii) the paging area recognized by the vehicular wireless apparatus 1.

(Modifications)

In the explanation of the flowchart of FIG. 2, at Step 140, each time the location registration is done, the paging area information of the EEPROM 40 is made invalid. After being made φ (invalid) once, the paging area information stored in the EEPROM 40 may not be updated, and thus may remain φ (invalid) even when the paging area information stored in the RAM 70 changes. Such memory control is done to make the paging area information stored in the EEPROM 40 φ (invalid) once. After that, the paging area information φ (invalid) does not need to be stored many times. Accordingly, the number of the writings of the paging area information in the EEPROM can be reduced further. This can enhance the effect that a lifespan of the EEPROM can be made longer due to the number of the writings in the EEPROM.

In the explanation of the flowchart of FIG. 2, when the predetermined time elapses after the timer is started at Step 200, the timer times out at Step 110. Instead of using the timer, when the current consumption by the wireless device 10 or vehicular wireless apparatus 1 is detected, and the cumulative current consumption equal to or over a predetermined value is detected, the process of Step 220 may be executed.

In the above embodiment, just after the ACC switch is turned off, the paging area is stored in the EEPROM 40. The paging area may be stored in the EEPROM 40 predetermined seconds after the ACC switch is turned off.

Each or any combination of processes or steps explained in the above can be achieved as a software unit (e.g., subroutine) and/or a hardware unit (e.g., circuit or integrated circuit), including or not including a function of a related device; furthermore, the hardware unit can be constructed inside of a microcomputer.

It will be obvious to those skilled in the art that various changes may be made in the above-described embodiments of the present invention. However, the scope of the present invention should be determined by the following claims.

What is claimed is:

1. A wireless apparatus for a vehicle, the apparatus comprising:
   a wireless device configured for running wireless communication with a base station that sends paging area information and for executing a location registration, which corresponds to the paging area information, to the base station;
   a volatile memory device configured for storing the paging area information to which the executed location registration corresponds;
   a nonvolatile memory device configured for storing the paging area information, which is stored in the volatile memory device after the wireless device executes the location registration; and
   a control device including
      a memory control unit configured to read out the paging area information in the volatile memory device and writes the read paging area information in the nonvolatile memory device,
      a vehicle operation determining unit configured to determine whether a driving source of the vehicle stops or starts,
      a wireless activating unit configured to activate the wireless device when the driving source is determined to start,
      a reset unit configured to initialize the volatile memory device when the driving source is determined to start,
      a registration control unit configured to (i) execute a determination whether paging area information, which is stored in the nonvolatile memory device before the driving source starts, matches paging area information, which is sent from the base station after the driving source starts and (ii) cause the wireless device to execute location registration when the determination is negative while causing the wireless device to execute no location registration when the determination is affirmative,
      a wireless control unit configured to cause the wireless device to continue running wireless communication for a predetermined time after the driving source of the vehicle is determined to stop, and
      a time counter for determining whether a predetermined time elapses after the driving source of the vehicle is determined to stop, wherein,
   when the time counter determines that the predetermined time elapses since the driving source of the vehicle is determined to stop,
      (i) the memory control means reads out paging area information stored in the volatile memory device, and writes the read paging area information in the nonvolatile memory device and then
      (ii) the wireless control means stops the power supply to the wireless device to thereby cause the wireless device to stop running the wireless communication, wherein,
   when the driving source of the vehicle is determined to stop, the memory control unit reads out newest paging area information from the volatile memory device, and writes the newest read paging area information in the nonvolatile memory device; and
   in case that paging area information is newly received and stored in the volatile memory device during the predetermined time after the driving source of the vehicle is determined to stop,
   the registration control unit executes a determination whether the newly received paging area information, which is stored in the volatile memory, matches the paging area information stored in the nonvolatile memory device; and
   when the determination is negative,
   the registration control unit causes the wireless device to execute a location registration corresponding to the newly received paging area information and
   the memory control unit deletes the paging area information stored in the nonvolatile memory device.

2. A wireless apparatus for a vehicle, the apparatus comprising:
   a wireless device for running wireless communication with a base station that sends paging area information and for executing a location registration, which corresponds to the paging area information, to the base station;
   a volatile memory device for storing the paging area information to which the executed location registration corresponds;
   a nonvolatile memory device for storing the paging area information, which is stored in the volatile memory device after the wireless device executes the location registration;
   memory control means for reading out the paging area information in the volatile memory device and writing the read paging area information in the nonvolatile memory device;
   vehicle operation determining means for determining whether a driving source of the vehicle stops or starts;
   wireless activating means for activating the wireless device when the driving source is determined to start;
   reset means for initializing the volatile memory device when the driving source is determined to start;
   registration control means for (i) executing a determination whether paging area information, which is stored in the nonvolatile memory device before the driving source starts, matches paging area information, which is sent from the base station after the driving source starts and (ii) causing the wireless device to execute location registration when the determination is negative while causing the wireless device to execute no location registration when the determination is affirmative;
   wireless control means for causing the wireless device to continue running wireless communication by controlling a power supply to the wireless device after the driving source of the vehicle is determined to stop; and
   a time counter for determining whether a predetermined time elapses after the driving source of the vehicle is determined to stop,
   wherein,
   when the time counter determines that the predetermined time elapses since the driving source of the vehicle is determined to stop,
   (i) the memory control means reads out paging area information stored in the volatile memory device, and writes the read paging area information in the nonvolatile memory device and then
   (ii) the wireless control means stops the power supply to the wireless device to thereby cause the wireless device to stop running the wireless communication,
   when the driving source of the vehicle is determined to stop, the memory control unit reads out newest paring area information from the volatile memory device, and writes the newest read paging area information in the nonvolatile memory device;

in case that paging area information is newly received and stored in the volatile memory device during the predetermined time after the driving source of the vehicle is determined to stop, the registration control means executes a determination whether the newly received paging area information, which is stored in the volatile memory device, matches the paging area information stored in the nonvolatile memory device; and when the determination is negative, the registration control means causes the wireless device to execute a location registration corresponding to the newly received paging area information and the memory control means deletes the paging area information stored in the nonvolatile memory device.

3. A wireless apparatus for a vehicle, the apparatus comprising:

a wireless device for running wireless communication with a base station that sends paging area information and for executing a location registration, which corresponds to the paging area information, to the base station;

a volatile memory device for storing the paging area information to which the executed location registration corresponds;

a nonvolatile memory device for storing the paging area information, which is stored in the volatile memory device after the wireless device executes the location registration;

memory control means for reading out the paging area information in the volatile memory device and writing the read paging area information in the nonvolatile memory device;

vehicle operation determining means for determining whether a driving source of the vehicle stops or starts;

wireless activating means for activating the wireless device when the driving source is determined to start;

reset means for initializing the volatile memory device when the driving source is determined to start;

registration control means for (i) executing a determination whether paging area information, which is stored in the nonvolatile memory device before the driving source starts, matches paging area information, which is sent from the base station after the driving source starts and (ii) causing the wireless device to execute location registration when the determination is negative while causing the wireless device to execute no location registration when the determination is affirmative;

wireless control means for causing the wireless device to continue running wireless communication by controlling a power supply to the wireless device after the driving source of the vehicle is determined to stop; and current determining means for determines whether consumption currents, which flow after the driving source of the vehicle is determined to stop, reach a predetermined amount, wherein, when the current determining means determines that the consumption currents reach the predetermined amount, (i) the memory control means reads out paging area information, which is stored in the-volatile memory device, and writes the read paging area information in the nonvolatile memory device and (ii) the wireless control means stops the power supply to the wireless device to thereby cause the wireless device to stop running the wireless communication when the driving source of the vehicle is determined to stop, the memory control unit reads out newest paging area information from the volatile memory device, and writes the newest read paging area information in the nonvolatile memory device, in case that paging area information is newly received and stored in the volatile memory device during a period from when the driving source of the vehicle is determined to stop to when the consumption currents reach the predetermined amount, the registration control means executes a determination whether the newly received paging area information, which is stored in the volatile memory device, matches the paging area information stored in the nonvolatile memory device; and when the determination is negative, the registration control means causes the wireless device to execute a location registration corresponding to the newly received paging area information and the memory control means deletes the paging area information stored in the nonvolatile memory device.

* * * * *